United States Patent
Takeuchi et al.

(10) Patent No.: US 9,287,562 B2
(45) Date of Patent: Mar. 15, 2016

(54) NEGATIVE ELECTRODE ACTIVE MATERIAL COMPRISING SPINEL LITHIUM TITANATE, ELECTRICAL STORAGE DEVICE, AND METHOD FOR PRODUCING NEGATIVE ELECTRODE ACTIVE MATERIAL

(71) Applicant: PANASONIC CORPORATION, Osaka (JP)

(72) Inventors: Takashi Takeuchi, Osaka (JP); Masaki Hasegawa, Osaka (JP); Natsumi Goto, Hyogo (JP)

(73) Assignee: Panasonic Intellectual Property Management Corporation Co., Ltd., Osaka (JP)

( * ) Notice: Subject to any disclaimer, the term of this patent is extended or adjusted under 35 U.S.C. 154(b) by 148 days.

(21) Appl. No.: 14/361,237

(22) PCT Filed: Nov. 27, 2012

(86) PCT No.: PCT/JP2012/007579
§ 371 (c)(1),
(2) Date: May 28, 2014

(87) PCT Pub. No.: WO2013/080515
PCT Pub. Date: Jun. 6, 2013

(65) Prior Publication Data
US 2014/0335357 A1 Nov. 13, 2014

(30) Foreign Application Priority Data

Nov. 29, 2011 (JP) .................................. 2011-260436

(51) Int. Cl.
*H01M 4/131* (2010.01)
*H01M 4/485* (2010.01)
*C01G 23/00* (2006.01)

(52) U.S. Cl.
CPC ............. *H01M 4/485* (2013.01); *C01G 23/005* (2013.01); *C01P 2002/32* (2013.01); *C01P 2006/12* (2013.01); *Y02E 60/122* (2013.01); *Y02P 70/54* (2015.11); *Y10T 428/2982* (2015.01)

(58) Field of Classification Search
CPC ............. C01G 23/005; C01P 2006/12; C01P 2006/90; Y02E 60/122; H01M 4/131; H01M 4/485
USPC ............................... 423/598, 641; 429/231.95
See application file for complete search history.

(56) References Cited

U.S. PATENT DOCUMENTS

| | | |
|---|---|---|
| 2003/0017104 A1 | 1/2003 | Spitler et al. |
| 2007/0009798 A1 | 1/2007 | Inagaki et al. |
| 2007/0238023 A1 | 10/2007 | Gorshkov et al. |
| 2008/0226987 A1 | 9/2008 | Yumoto et al. |

(Continued)

FOREIGN PATENT DOCUMENTS

| | | |
|---|---|---|
| CN | 1919736 A | 2/2007 |
| CN | 101428851 A | 5/2009 |

(Continued)

OTHER PUBLICATIONS

Chinese Office Action issued in Chinese Application No. 201280055851.5 dated Aug. 25, 2015, with English translation of Search Report.
International Search Report issued in PCT/JP2012/007579, dated Jan. 22, 2013, with English translation.

*Primary Examiner* — Holly Le
(74) *Attorney, Agent, or Firm* — McDermott Will & Emery LLP (57) ABSTRACT

A negative-electrode active material disclosed herein contains a lithium titanate having a spinel structure, and satisfies the relationship B×P<50, where B is a specific surface (unit: $m^2/g$) of the lithium titanate as measured by a BET technique; and P is obtained by immersing 1 g of the lithium titanate in 50 $cm^3$ of redistilled water and determining a pH of the redistilled water after 30 minutes of agitation.

10 Claims, 3 Drawing Sheets

(56) References Cited

U.S. PATENT DOCUMENTS

| | | |
|---|---|---|
| 2009/0136415 A1 | 5/2009 | Gorshkov et al. |
| 2011/0044886 A1 | 2/2011 | Gorshkov et al. |
| 2011/0052942 A1* | 3/2011 | Inagaki .................. B82Y 30/00 429/7 |
| 2011/0067230 A1 | 3/2011 | Tan et al. |
| 2012/0077074 A1* | 3/2012 | Hoshina ............... C01G 23/005 429/149 |

FOREIGN PATENT DOCUMENTS

| | | |
|---|---|---|
| JP | 2001-143702 A | 5/2001 |
| JP | 2007-018883 A | 1/2007 |
| JP | 2009-176752 A | 8/2009 |
| JP | 2011-520752 A | 7/2011 |
| JP | 2011-181367 A | 9/2011 |
| WO | 03-008334 A1 | 1/2003 |
| WO | 2012-153561 A1 | 11/2012 |

* cited by examiner

NEGATIVE ELECTRODE ACTIVE MATERIAL COMPRISING SPINEL LITHIUM TITANATE, ELECTRICAL STORAGE DEVICE, AND METHOD FOR PRODUCING NEGATIVE ELECTRODE ACTIVE MATERIAL

RELATED APPLICATIONS

This application is the U.S. National Phase under 35 U.S.C. §371 of International Application No. PCT/JP2012/007579, filed on Nov. 27, 2012, which in turn claims the benefit of Japanese Application No. 2011-260436, filed on Nov. 29, 2011, the disclosures of which Applications are incorporated by reference herein.

TECHNICAL FIELD

The present application relates to a negative-electrode active material, an electricity storage device, and a method of producing a negative-electrode active material.

BACKGROUND ART

In recent years, lithium-ion secondary batteries have come into practical use as electricity storage devices having high energy density.

Conventionally, carbon-type materials are generally used as the negative electrode material capable of occluding and releasing lithium ions in a lithium-ion secondary battery. However, in a negative electrode for which a carbon material is used, the reaction potential at lithium ion occlusion or release is as low as 0.1 V (vs. Li/Li$^+$) or less, which is close to the dissolution/deposition potential of lithium. Therefore, deposition of metal lithium on the negative electrode surface is likely to occur particularly during rapid charging in a low temperature environment, in which reactivity decreases. Deposition of metal lithium on the negative electrode not only causes internal short-circuiting, but also induces decrease in capacity due to passivation, and may possibly cause operation insufficiencies and performance deteriorations of the battery.

Accordingly, oxide-type materials such as lithium titanate are being studied as alternative negative electrode materials to carbon materials. Lithium titanate is a complex oxide having a spinel-type crystal structure similar to that of lithium manganate, which is used as a positive electrode material, and thus is capable of reversibly occluding and releasing lithium ions. Unlike lithium manganate, lithium titanate reversibly reacts with lithium at a potential as low as about 1.5 V (vs. Li/Li$^+$), and therefore can be used the negative electrode material. Moreover, it undergoes very little volumetric change in charging and discharging reactions at this potential, and is expected to have excellent characteristics as an electrode material for secondary batteries to undergo repetitive charging and discharging.

As an example of a known lithium titanate, Patent Document 1 discloses a negative-electrode active material of the composition expressed as $Li_aTi_{3-a}O_4$ (where a in the formula represents a number such that 0<a<3), in which primary particles with an average particle size of less than 1 μm constitute secondary particles with an average particle size of 5 to 100 μm.

On the other hand, Patent Document 2 discloses a lithium titanate with an average pore diameter of 5 nm to 50 nm and a pH ranging from 10 to 11.2. Patent Documents 1 and 2 disclose that a secondary battery with excellent large current characteristics and cycle characteristics can be realized.

CITATION LIST

Patent Literature

[Patent Document 1] Japanese Laid-Open Patent Publication No. 2001-143702
[Patent Document 2] Japanese Laid-Open Patent Publication No. 2009-176752

SUMMARY OF INVENTION

Technical Problem

However, further improvements in the secondary battery characteristics are needed in the aforementioned conventional techniques.

One non-limiting, and exemplary embodiment of the present application provides an electricity storage device having better characteristics than conventional, a negative-electrode active material to be used therefore, and a method of producing the negative-electrode active material.

Solution to Problem

A negative-electrode active material according to an aspect of the present invention contains a lithium titanate having a spinel structure. The relationship B×P<50 is satisfied, where B is a specific surface (unit: m$^2$/g) of the lithium titanate as measured by a BET technique; and P is obtained by immersing 1 g of the lithium titanate in 50 cm$^3$ of redistilled water and determining a pH of the redistilled water after 30 minutes of agitation.

Advantageous Effects of Invention

In a negative-electrode active material according to an aspect of the present invention, the amounts of base substances such as lithium carbonate and lithium hydroxide, which are sources of $CO_2$ generation, and the quantity of the specific surface of lithium titanate, which serves as a reaction field for $CO_2$ and the electrolyte, are adjusted. Therefore, $CO_2$ generation can be effectively suppressed during storage at high temperatures. Therefore, an electricity storage device containing this negative-electrode active material has a high reliability because of not generating much gas during storage at high temperatures.

BRIEF DESCRIPTION OF DRAWINGS

FIG. 1 (a) is a perspective view of a lithium-ion secondary battery according to a second embodiment of the present invention; (b) is a cross-sectional view of the lithium-ion secondary battery according to the second embodiment of the present invention; and (c) is an enlarged cross-sectional view of an electrode group 13 according to the second embodiment of the present invention.

DESCRIPTION OF EMBODIMENTS

The inventors have conducted various studies in order to improve the characteristics of a lithium-ion secondary battery in which lithium titanate is used as a negative electrode active material. It has thus been found that a lithium-ion secondary battery in which lithium titanate is used as the negative electrode active material allows more gas, particularly $CO_2$, to be generated during storage at high temperatures than in the case where a carbon material is used as the negative-electrode active material.

In order to improve this problem and reduce $CO_2$ generation during storage at high temperatures, the inventors have conducted detailed studies concerning the surface state of lithium titanate particles which are used as the negative-electrode active material, thus arriving at the present invention. In outline, an aspect of the present invention is as follows.

A negative-electrode active material according to an aspect of the present invention comprises a lithium titanate having a spinel structure, wherein the relationship B×P<50 is satisfied, where B is a specific surface (unit: $m^2/g$) of the lithium titanate as measured by a BET technique; and P is obtained by immersing 1 g of the lithium titanate in 50 $cm^3$ of redistilled water and determining a pH of the redistilled water after 30 minutes of agitation.

B may be not less than 0.7 $m^2/g$ and not more than 4.7 $m^2/g$, and P may be not less than 9.7 and not more than 10.7.

The lithium titanate may have a composition expressed as $Li_4Ti_5O_{12}$.

B and P may satisfy the relationship B×P<30.

The lithium titanate has been washed with water.

In a preferred embodiment, the lithium titanate may have been washed with hot water.

An electricity storage device according to an aspect of the present invention comprises a negative electrode containing any of the above negative-electrode active materials.

A method of producing a negative-electrode active material according to an aspect of the present invention is a method of producing any of the above negative-electrode active materials, comprising: a step of, after synthesizing the lithium titanate, washing the lithium titanate with a liquid.

A main component of the liquid may be water, and the water may have a temperature of not less than 40° C. and not more than 80° C.

A method of producing a negative-electrode active material in another aspect of the present invention comprises a step of baking titanium oxide and at least one of lithium hydroxide and lithium carbonate in a molten salt to synthesize a titanium oxide having a spinel structure.

The molten salt may be obtained by mixing and melting lithium chloride and potassium chloride.

First Embodiment

An embodiment of a negative-electrode active material according to the present invention will be described.

The negative-electrode active material of the present embodiment contains a lithium titanate having a spinel structure. An example of a lithium titanate having a spinel structure may be a lithium titanate of the composition $Li_4Ti_5O_{12}$. When a lithium titanate is used as the negative-electrode active material of a lithium-ion secondary battery, it will assume the state of $Li_{4+x}Ti_5O_{12}(0 \leq x \leq 3)$ with charging and discharging reactions.

As an impurity phase, particles of lithium titanate may contain anatase-type titanium oxide ($TiO_2$), rutile-type titanium oxide ($TiO_2$), $Li_2TiO_3$, or $Li_2Ti_3O_7$. The effects of the present embodiment can be obtained even if such impurity layers are contained. Moreover, a lithium titanate whose constituent elements are partly substituted with a heterogeneous element(s) can also be suitably used as the negative-electrode active material of the present embodiment. This is because the effects obtained by the negative-electrode active material of the present embodiment mainly relate to the surface state of lithium titanate particles, and the exact composition of the lithium titanate exerts very little influence.

According to Patent Document 2, if any unreacted Li component such as lithium carbonate or lithium hydroxide remains on the surface of the negative-electrode active material, this reacts with the nonaqueous electrolyte to generate $CO_2$ and hydrogen gas. However, the inventors have conducted a detailed study of the surface state of lithium titanate particles and the $CO_2$ generation mechanism during storage at high temperatures, to find that the amount of generated $CO_2$ depends not only on the unreacted Li component but also on the specific surface of lithium titanate. Note that, when a lithium titanate powder and a carbonate-type electrolyte solution are sealed and stored at a high temperature, the $CO_2$ that is contained in the generated gas accounts for a ratio of 97% or more, and large part of the generated gas is $CO_2$.

Through a detailed study of the relationship of the pH, the specific surface, and the amount of generated $CO_2$ in various lithium titanates, the inventors have arrived at the finding that the amount of generated $CO_2$ can be suppressed to a certain amount or less when a mathematical product of the pH and the specific surface is less than 50. It has also been found that the amount of generated $CO_2$ can be further suppressed when a mathematical product of the pH and the specific surface is less than 30.

Specifically, the pH value P was defined as a value obtained by immersing 1 g of lithium titanate powder in 50 $cm^3$ of redistilled water, agitating it for 30 minutes, and measuring the pH of the redistilled water from which the lithium titanate powder was removed via filtration. A commercially-available pH meter may be used for the pH measurement, for example.

The specific surface B can be measured by a one-point BET technique directed to $N_2$ adsorption based on Brunauer-Emmet-Teller's equation.

As described above, in the lithium titanate of the negative-electrode active material of the present embodiment, the aforementioned P and B satisfy the relationship of eq. (1) below.

$$B \times P < 50 \quad (1)$$

Preferably, the lithium titanate has a specific surface B which is not less than 0.7 $m^2/g$ and not more than 4.7 $m^2/g$, and a pH value P which is not less than 9.7 and not more than 10.7. If the specific surface B is smaller than 0.7 $m^2/g$, the discharge output characteristics tend to be deteriorated. If the specific surface B is greater than 4.7 $m^2/g$, $CO_2$ generation tends to increase. If the pH is lower than 9.7, the charge-discharge capacity of the active material tends to decrease. If it is higher than 10.7, $CO_2$ generation tends to increase.

The specific reason is not completely clear as to why $CO_2$ generation is suppressed when eq. (1) above is satisfied. However, it is considered that the pH value P as defined above relates to the amount of unreacted Li adhering to the surface of lithium titanate, such that decomposition of the nonaqueous electrolyte solvent becomes more promoted as the amount of unreacted Li increases, especially when the lithium-ion secondary battery is at a high temperature. It is also considered that, since the lithium titanate surface contains functional groups which are involved in the decomposition of the nonaqueous electrolyte solvent, e.g., the hydroxyl group, an increased specific surface B may promote decomposition of the nonaqueous electrolyte solvent when the lithium-ion secondary battery is at a high temperature.

The negative-electrode active material of the present embodiment can be synthesized by mixing compounds that contain its component elements, followed by baking. Conventionally, the solid phase reaction technique is generally employed in the synthesis of lithium titanate. Specifically, the production involves a step of weighing an Li source and titanium oxide so as to constitute an appropriate ratio and homogeneously mixing together the weighed raw materials, and a step of baking the mixture. When any additive element is to be added, a raw material of the additive element may be mixed in the Li source and titanium oxide, and baked. The primary particle size of the lithium titanate after baking may depend on the particle size of titanium oxide. Therefore, in order to obtain a lithium titanate with a specific surface of less than 5 $m^2/g$, such as those used in Examples below, the primary particle size of titanium oxide may be 0.05 μm or more but 2.0 μm or less. If it is smaller than 0.05 μm, the primary particle size of the synthesized lithium titanate will not be sufficiently large. If the primary particle size is greater than 2.0 μm, reaction with the Li source will not progress sufficiently, so that a homogeneous lithium titanate may not be obtained. Generally speaking, the specific surface B of the lithium titanate after synthesis depends on the particle size of the raw powder containing titanium oxide, the baking conditions, and the additive elements, as mentioned above. Therefore, by adjusting these, a lithium titanate having a specific surface B satisfying eq. (1) above, in particular a specific surface B of not less than 0.7 $m^2/g$ and not more than 4.7 $m^2/g$, can be synthesized.

In the case of using the solid phase reaction technique, LiOH or a hydrate thereof, $Li_2CO_3$, $Li_2SO_4$, LiF, $Li_2O$, or the like can be used as the Li source. As LiOH hydrates, monohydrate ($LiOH.H_2O$) is commonly used, but LiOH hydrates with other water contents may also be used. From the standpoint of reaction temperature and possibility of residual impurities, LiOH or a hydrate thereof, or $Li_2CO_3$ may be used. As titanium oxide, those with rutile-type and anatase-type crystal structures can be used. From the standpoint of facilitating progression of reaction, those with an anatase-type crystal structure may be used.

The bake may be performed in an atmospheric ambient, an oxygen ambient, or an inert gas ambient such as nitrogen or argon. As for the bake temperature, lithium titanate powder can be obtained through baking the mixture at a temperature on the order of not less than 700° C. and not more than 1000° C., although it depends on the Li source, titanium oxide, and additive element material used. As the bake temperature increases, there is a tendency that the primary particle size of lithium titanate increases and that the specific surface decreases. When the bake temperature exceeds 950° C., increased amounts of heterogeneous phases such as $Li_2Ti_3O_7$ will be mixed. Therefore, in order to obtain a lithium titanate with a specific surface of less than 5 $m^2/g$, such as those which are used in Examples, baking may be performed at not less than 800° C. and not more than 950° C. Moreover, a highly crystalline lithium titanate can be obtained with 3 hours or more of bake time. As the bake time becomes longer, there is a tendency that the primary particle size of lithium titanate increases and that the specific surface decreases. Therefore, in order to obtain a lithium titanate with a specific surface of less than 5 $m^2/g$, such as those which are used in Examples, the bake time may be not less than 5 hours and not more than 15 hours. If the bake time is longer than 15 hours, the production efficiency will decrease.

Lithium titanate powder which is synthesized by the solid phase reaction technique is susceptible to aggregation or sintering; however, its grain size distribution can be adjusted through a pulverization (crushing) step. As the pulverization method, a pulverization method using an apparatus or utensil such as a jet mill, a bead mill, a ball mill, a mass colloider, or a mortar is possible. Among others, a pulverization method using a jet mill achieves pulverization through mutual collision of particles in an airflow, and allows for little possibility of impurity mixing, thereby being useful.

If the lithium titanate which is obtained through the above steps satisfies eq. (1) above, it can be straightforwardly used as the negative-electrode active material of the present embodiment. However, it may undergo hot-water washing, described below, for further pH reduction.

Lithium titanate which is produced by the solid phase reaction technique generally contains base substances that remained unreacted in the synthesis process, e.g., LiOH and $Li_2CO_3$. By washing the synthesized lithium titanate in water with stirring, the base substances can be removed. Besides water, other liquids in which these base substances can be dissolved may also be used, e.g., an organic solvent containing an organic acid may be used. However, since these base substances dissolve best in water, lithium titanate may be washed with a liquid whose main component is water. Although removal of base substances is also possible with water of room temperature, the washing water may be hot water at not less than 40° C. and not more than 80° C. in order to improve the effect and efficiency of base substance removal. If the water temperature is lower than 40° C., removal of base substances may not sufficiently progress; if the water temperature is higher than 80° C., complicated equipment may be required from standpoints such as thermal insulation and evaporation prevention.

After washing away the base substances, the negative-electrode active material of the present embodiment is obtained by drying the lithium titanate. Although there are no particular limitations as to the drying temperature, it may be not less than 100° C. and not more than 700° C. If it is lower than 100° C., drying will take time; if it is higher than 700° C., desired physical properties may not be obtained because of the sintering of the lithium titanate particles.

The negative-electrode active material of the present embodiment can also be synthesized by the molten salt synthesis method. In the case where the molten salt synthesis method is used, it is possible to synthesize a material which is not susceptible to much aggregation and does not require a pulverization step, unlike in the case of the solid phase reaction technique. Specifically, the production involves a step of weighing an Li source, titanium oxide, and a molten salt material so as to constitute an appropriate ratio and homogeneously mixing together the weighed raw materials, a step of baking the mixture, and a step of washing the bake to remove the molten salt. In the bake step, reaction progresses in the molten salt, which is in a liquid state at the bake temperature, and the matter after the reaction is present in the molten salt; therefore, little contact with other particles occurs. Thus, it is possible to synthesize a negative-electrode active material which is not susceptible to much aggregation or sintering.

In the molten salt synthesis method, LiOH or a hydrate thereof, $Li_2CO_3$, $Li_2SO_4$, LiF, $Li_2O$, or the like can be used as the Li source. As LiOH hydrates, monohydrate (LiOH.H$_2$O) is commonly used, but LiOH hydrates with other water contents may also be used. From the standpoint of reaction temperature and possibility of residual impurities, LiOH or a hydrate thereof, or Li$_2$CO$_3$ may be used. As titanium oxide, those with rutile-type and anatase-type crystal structures can be used. From the standpoint of facilitating progression of reaction, those with an anatase-type crystal structure may be used. As the molten salt material, any compound whose melting point is relatively low and which can be removed through a washing step may be used. In order to facilitate progression of reaction, a compound containing the Li element may be used, e.g., LiCl, Li$_2$SO$_4$, or LiClO$_4$. Moreover, KCl, a mixture with LiCl or KCl, and the like can also be used.

The bake may be performed in an atmospheric ambient, an oxygen ambient, or an inert gas ambient such as nitrogen or argon. As for the bake temperature, a mixture of lithium titanate and a molten salt can be obtained through baking the mixture at a temperature which is equal to or greater than the melting point of the molten salt used, although it depends on the Li source, titanium oxide, and additive element material used.

In the washing step, use of a liquid in which the molten salt is dissolvable will allow to easily wash the lithium titanate-molten salt mixture, and remove the molten salt. For example, in the case where LiCl and KCl, or a mixture of LiCl and KCl is used as the molten salt, it can be dissolved in water. Although removal of the molten salt is also possible with water of room temperature, the washing water may be hot water at not less than 40° C. and not more than 80° C. in order to achieve efficient removal of base substances together with removal of the molten salt. If the water temperature is lower than 40° C., removal of base substances may not sufficiently progress; if the water temperature is higher than 80° C., complicated equipment may be required from standpoints such as thermal insulation and evaporation prevention. After washing the molten salt and the base substances, the negative-electrode active material of the present embodiment is obtained by drying the lithium titanate. Although there are no particular limitations as to the drying temperature, it may be not less than 100° C. and not more than 700° C. If it is lower than 100° C., drying will take time; if it is higher than 700° C., desired physical properties may not be obtained because of the lithium titanate particles sintering together.

Second Embodiment

Figure 1:
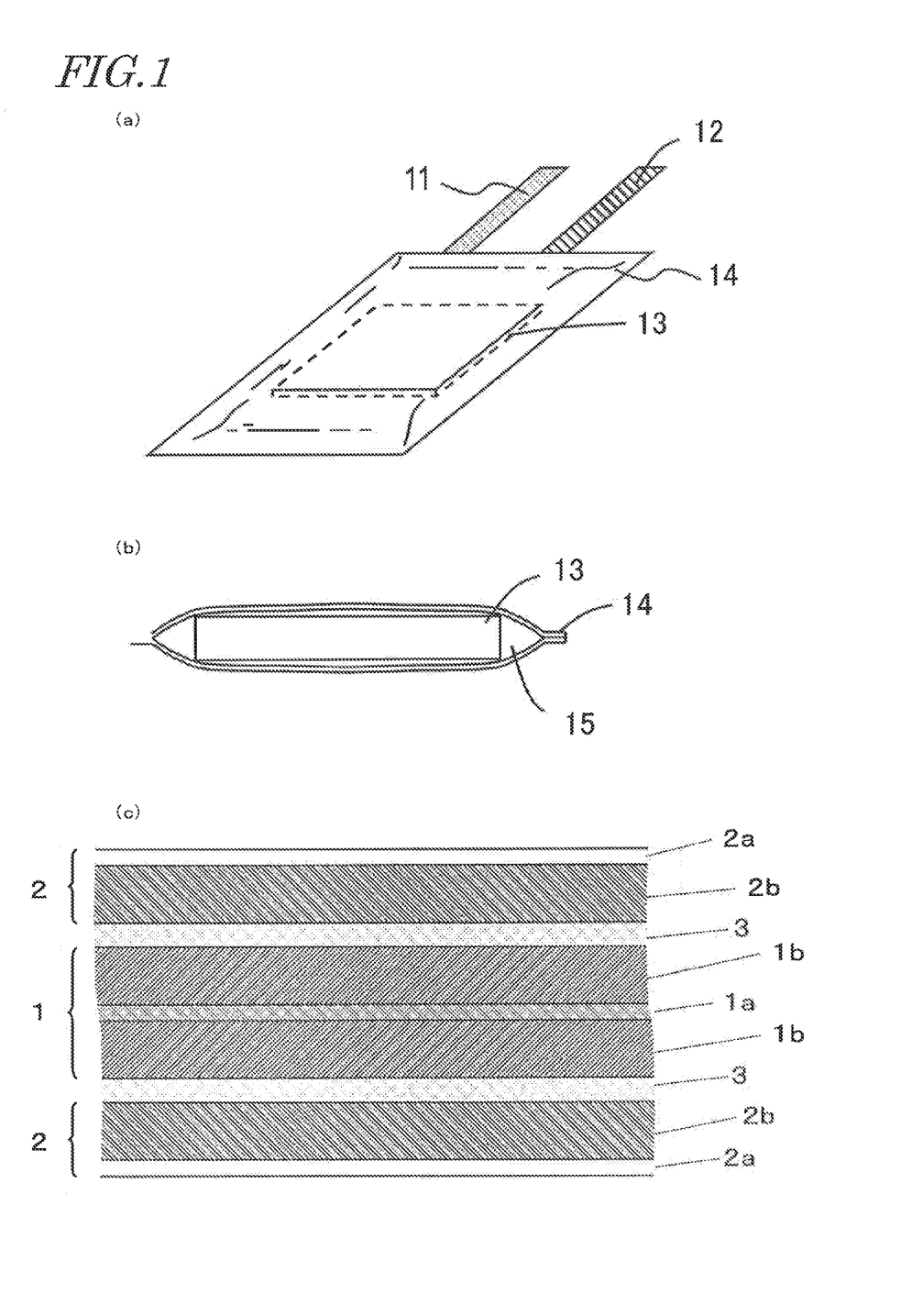

Hereinafter, an embodiment of an electricity storage device according to the present invention will be described. The electricity storage device of the present embodiment is a lithium-ion secondary battery. FIGS. 1($a$) and ($b$) are a perspective view and a cross-sectional view of the lithium-ion secondary battery of the present embodiment.

As shown in FIGS. 1($a$) and ($b$), the lithium-ion secondary battery of the present embodiment includes an electrode group 13, a battery case 14 accommodating the electrode group 13, and a nonaqueous electrolyte solution 15 filling the battery case 14. A positive electrode in the electrode group 13 is connected to a positive electrode lead 11, and negative electrodes in the electrode group 13 are connected to a negative electrode lead 12. The positive electrode lead 11 and the negative electrode lead 12 are taken out into the exterior of the battery case 14.

As shown in FIG. 1($c$), the electrode group 13 includes the positive electrode 1, the negative electrodes 2, and separators 3 provided between the positive electrode 1 and the negative electrodes 2. The positive electrode 1 includes a positive-electrode current collector 1$a$ made of an aluminum foil having a thickness of 20 µm and positive-electrode active material layers 1$b$ made of LiCoO$_2$ which is applied on the surfaces of the positive-electrode current collector 1$a$. On the other hand, each negative electrode 2 includes a negative-electrode current collector 2$a$ made of an aluminum foil having a thickness of 20 µm and a negative-electrode active material layer 2$b$ made of Li$_4$Ti$_5$O$_{12}$ which is applied on the surface of the negative-electrode current collector 2$a$. The separators 3 are made of microporous films of polyethylene, for example.

As the material of the positive-electrode active material layers 1$b$, lithium-containing transition metal oxides other than LiCoO$_2$ may also be used. For example, Li$_x$CoO$_2$, Li$_x$NiO$_2$, Li$_x$MnO$_2$, Li$_x$Co$_y$Ni$_{1-y}$O$_2$, Li$_x$Co$_y$M$_{1-y}$O$_z$, Li$_x$Ni$_{1-y}$M$_y$O$_z$, Li$_x$Mn$_2$O$_4$, and Li$_x$Mn$_{2-y}$M$_y$O$_4$ (where M is at least one kind among Na, Mg, Sc, Y, Mn, Fe, Co, Ni, Cu, Zn, Al, Cr, Pb, Sb, and B; x=0 to 1.2; y=0 to 0.9; z=1.7 to 2.3) may be possible. Other than these materials, any material that causes the potential of the positive electrode 1 during charging to exceed 4 V (vs. Li) may be used. Moreover, a plurality of different materials may be mixed for use as the positive-electrode active material. In the case where the positive-electrode active material is powder, the average particle size is not particularly limited, but may especially be 0.1 to 30 µm. Although each positive-electrode active material layer 1$b$ usually has a thickness of on the order of 50 µm to 100 µm, it may be a thin film (with a thickness from 0.1 µm to 10 µm, m) which is formed on the positive-electrode current collector 1$a$. Alternatively, it may be a thick film having a thickness of 10 µm to 50 µm.

The positive-electrode active material layers 1$b$ may contain both of, or only one of, an electrically-conductive substance and a binder agent in addition to the active material. Alternatively, the positive-electrode active material layers 1$b$ may be composed only of the active material, i.e., containing neither an electrically-conductive substance nor a binder agent.

The electrically-conductive substance for the positive electrode 1 may be any electron-conductive material that does not undergo chemical changes at the charge/discharge potential of the positive electrode 1. For example, graphites and carbon blacks, carbon fibers, electrically-conductive fibers such as metal fibers, metal powders, electrically-conductive whiskers, electrically-conductive metal oxides or organic electrically-conductive materials, etc., may be used each alone or in a mixture. Although there are no particular limitations, the amount of electrically-conductive substance to be added may be 1 to 50 weight % based on the positive electrode material, or 1 to 30 weight %.

The binder agent to be used for the positive electrode 1 may be either a thermoplastic resin or a thermosetting resin. Usable binder agents are, for example: polyolefin resins such as polyethylene and polypropylene; fluorine-type resins such as polytetrafluoroethylene (PTFE), polyvinylidene fluoride (PVDF), and hexafluoropropylene (HFP) and copolymer resins thereof; polyacrylic acids and copolymer resins thereof; and so on.

Other than electrically-conductive substances and binder agents, fillers, dispersants, ion conductors, pressure enhancing agents and various other additives may be used. The filler may be any fibrous material that does not undergo chemical changes within the lithium-ion secondary battery.

The material of the positive-electrode current collector 1$a$ may be any electron conductor that does not undergo chemical changes at the charge/discharge potential of the positive electrode 1. For example, stainless steels, aluminum, titanium, carbon, electrically-conductive resins, and the like may be used. Moreover, it is desirable to confer ruggednesses on the surface of the positive-electrode current collector 1a through a surface treatment. In addition to a foil, it may be in a form of film, sheet, net, perforated body, lath body, porous body, foam, fiber, formed nonwoven fabric, or the like. Although there are no particular limitations, its thickness is generally 1 to 500 µm.

As the material of the negative-electrode active material layer 2b, the negative-electrode active material in the first embodiment is used. Alternatively, other different materials may be mixed for use as the negative-electrode active material.

The negative-electrode active material in the first embodiment has a low electron conductivity as compared to conventional materials for the negative-electrode active material such as graphite. Therefore, the negative electrode of the lithium-ion battery of the present embodiment may contain an electrically-conductive substance other than the negative-electrode active material in the first embodiment. The electrically-conductive substance for the negative-electrode active material may be any electron-conductive material that does not undergo chemical changes at the charge/discharge potential of the negative electrode. For example, graphites and carbon blacks, carbon fibers, electrically-conductive fibers such as metal fibers, metal powders, electrically-conductive whiskers, electrically-conductive metal oxides or organic electrically-conductive materials, etc., may be used each alone or in a mixture. Although there are no particular limitations, the amount of electrically-conductive substance to be added may be 1 to 50 weight % based on the negative electrode material, or 1 to 30 weight %.

Furthermore, the negative-electrode active material layer 2b may contain a binder agent in addition to the active material and the electrically-conductive substance, which may be either a thermoplastic resin or a thermosetting resin. Usable binder agents are, for example: polyolefin resins such as polyethylene and polypropylene; fluorine-type resins such as polytetrafluoroethylene (PTFE), polyvinylidene fluoride (PVDF), and hexafluoropropylene (HFP) and copolymer resins thereof; polyacrylic acids and copolymer resins thereof; and so on.

Other than electrically-conductive substances and binder agents, fillers, dispersants, ion conductors, pressure enhancing agents and various other additives may be used. The filler may be any material that does not undergo chemical changes within the lithium-ion secondary battery.

As the negative-electrode current collector 2a, a copper foil, a nickel foil, a stainless steel foil, or the like may be used, for example. However, because of the high charge/discharge potential of its negative electrodes, the lithium-ion battery of the present embodiment allows an aluminum foil to be used, unlike conventional batteries.

As the nonaqueous electrolyte solution 15, those nonaqueous electrolyte solutions which are used in lithium-ion secondary batteries are used. For example, a nonaqueous solvent in which ethylene carbonate (EC)(commercial battery grade) and ethyl methyl carbonate (EMC)(commercial battery grade) are mixed at a ratio of 1:3 can be used as the nonaqueous electrolyte solution. In this nonaqueous solvent, $LiPF_6$ (commercial battery grade) is dissolved at a concentration of 1 mol/l as a supporting electrolyte salt. Although the present embodiment employs this combination of a nonaqueous solvent and a supporting electrolyte salt as an illustrative electrolyte solution, those of any other combination that is usable in lithium-ion secondary batteries may also be used.

With the lithium-ion secondary battery of the present embodiment, as has been described in the first embodiment, little gas occurs during storage at high temperatures because the negative-electrode active material satisfies the physical properties expressed by eq. (1) above. Therefore, the lithium-ion secondary battery of the present embodiment has a high reliability such that: little deformation occurs during storage at high temperatures even when the outer case is of a metal laminate having poor strength; and, even in the case where a current breaker safety mechanism of an internal pressure activated-type is included, the safety mechanism will not be activated in error during storage at high temperatures.

Although the present embodiment takes a sheet-type lithium-ion secondary battery as an example, the lithium-ion secondary battery of the present embodiment may also have other shapes. For example, the lithium-ion secondary battery of the present embodiment may have a cylindrical or rectangular shape. Alternatively, it may be of a large form for use in electric vehicles or the like.

The lithium-ion secondary battery of the present embodiment can be suitably used for personal digital assistants, portable electronic devices, small power storage devices for households, motorcycles, electric vehicles, hybrid electric vehicles, and the like. It can also be used for other devices.

EXAMPLES

Results of synthesize and examining the characteristics lithium titanates having various specific surfaces and pH values P will be described in detail.

1. Synthesis of Negative-Electrode Active Material

Example 1

A negative-electrode active material according to Example 1 was synthesized by solid phase reaction technique.

Raw materials $LiOH.H_2O$ and $TiO_2$ were weighed so that the molar mixing ratio between $LiOH/TiO_2$ was 4/5, and these were placed in a mortar and mixed for about 10 minutes. As the raw material $TiO_2$, that which having an anatase-type crystal structure and an average particle size of about 0.3 µm was used.

The mixed raw powder was placed in a crucible made of $Al_2O_3$, and baked in an electric furnace within an atmospheric ambient. The bake temperature was 800° C., and the bake temperature was retained for 5 hours.

The baked material was taken out of the crucible, pulverized in a mortar for about 10 minutes, thereby obtaining the lithium titanate powder of interest.

Example 2

The negative-electrode active material of Example 2 was synthesized in a similar manner to Example 1, except that: the bake temperature was 850° C.; the bake temperature was retained for 12 hours; the baked material was taken out of the crucible and pulverized in a mortar for about 10 minutes; a step of washing with hot water of 60° C. followed by filtration was repeated three times; and thereafter it was retained in a vacuum state at 400° C. for 12 hours for drying.

Example 3

The negative-electrode active material of Example 3 was synthesized in a similar manner to Example 2, except that: the bake temperature was 900° C.; and the bake temperature was retained for 12 hours.

Example 4

The negative-electrode active material of Example 4 was synthesized in a similar manner to Example 2, except that: the bake temperature was 950° C.; and the bake temperature was retained for 12 hours.

Example 5

The negative-electrode active material of Example 5 was synthesized by molten salt synthesis method. Raw materials $LiOH.H_2O$, $TiO_2$, LiCl, and KCl were weighed so that the molar mixing ratio between $LiOH/TiO_2/LiCl/KCl$ was 4/5/12/8, and these were placed in a mortar and mixed for about 10 minutes. As the raw material $TiO_2$, that which having an anatase-type crystal structure and an average particle size of about 0.3 μm was used.

The mixed raw powder was placed in a crucible made of $Al_2O_3$, and baked in an electric furnace within an atmospheric ambient. The bake temperature was 800° C., and the bake temperature was retained for 8 hours.

The baked material was taken out of the crucible, from which the molten salt was removed by repeating a step of washing with hot water of 60° C. followed by filtration three times. The powder from which the molten salt had been sufficiently removed was retained in a vacuum state at 400° C. for 12 hours for drying, thereby obtaining the lithium titanate powder of interest.

Comparative Example 1

A lithium titanate ($Li_4Ti_5O_{12}$) powder of commercial battery grade was obtained, in which primary particles constituted secondary particles of substantially spherical shape (average particle size: 24 μm; specific surface by BET technique: 2.9 $m^2/g$), and was subjected to a pulverization treatment to provide the negative-electrode active material of Comparative Example 1. A jet mill manufactured by SEISHIN ENTERPRISE Co., Ltd. was used for pulverization.

Comparative Example 2

A lithium titanate ($Li_4Ti_5O_{12}$) powder of commercial battery grade was obtained, in which primary particles constituted secondary particles of substantially spherical shape (average particle size: 24 μm; specific surface by BET technique: 2.9 $m^2/g$), and was subjected to a pulverization treatment by using a et mill manufactured by SEISHIN ENTERPRISE Co., Ltd. Then, a step of washing with hot water of 60° C. followed by filtration was repeated three times; and thereafter it was retained in a vacuum state at 400° C. for 12 hours for drying, thus providing the negative-electrode active material of Comparative Example 2.

2. Measurement of Specific Surface

The specific surface of the negative-electrode active materials of Examples 1 to 5 and Comparative Examples 1 and 2 was measured by one-point BET technique. ASAP-2010 manufactured by Shimadzu Micromeritics was used for the measurement. $N_2$ was used as the adsorption gas, and the measurement samples weighed 1 g. The measure values are shown in Table 1 as the B value in eq. (1) above.

3. Measurement of pH

The pH of the negative-electrode active materials of Examples 1 to 5 and Comparative Examples 1 and 2 was measured by the following method. One gram of each of the negative-electrode active materials of Examples 1 to 5 and Comparative Examples 1 and 2 was immersed in 50 $cm^3$ of redistilled water; thereafter, this was agitated by using a stirrer for 30 minutes, and a suction filtration was performed, thus removing the negative-electrode active material from an aqueous solution, the pH of which was measured to define the pH of the negative-electrode active material. A pH meter, manufactured by HORIBA, was used after calibration by using pH7 and pH9 standard solutions. The measured values are shown in Table 1 as the P value in eq. (1) above.

4. Measurement of Amount of Generated $CO_2$

The amount of generated $CO_2$ from the negative-electrode active materials of Examples 1 to 5 and Comparative Examples 1 and 2 was measured by the following method. Two grams of each of the negative-electrode active materials of Examples 1 to 5 and Comparative Examples 1 and 2, as well as 3 $cm^3$ of a nonaqueous electrolyte solution, was accommodated in an aluminum laminate bag (shorter side 6 cm×longer side 12 cm) having an opening along the shorter side, and this was sealed under reduced pressure to become an evaluation sample. The nonaqueous electrolyte solution used was obtained by dissolving $LiPF_6$ (commercial battery grade) as a supporting electrolyte salt at a concentration of 1 mol/l in a nonaqueous solvent in which ethylene carbonate (EC)(commercial battery grade) and ethyl methyl carbonate (EMC) (commercial battery grade) were mixed at a ratio of 1:3.

Figure 2:
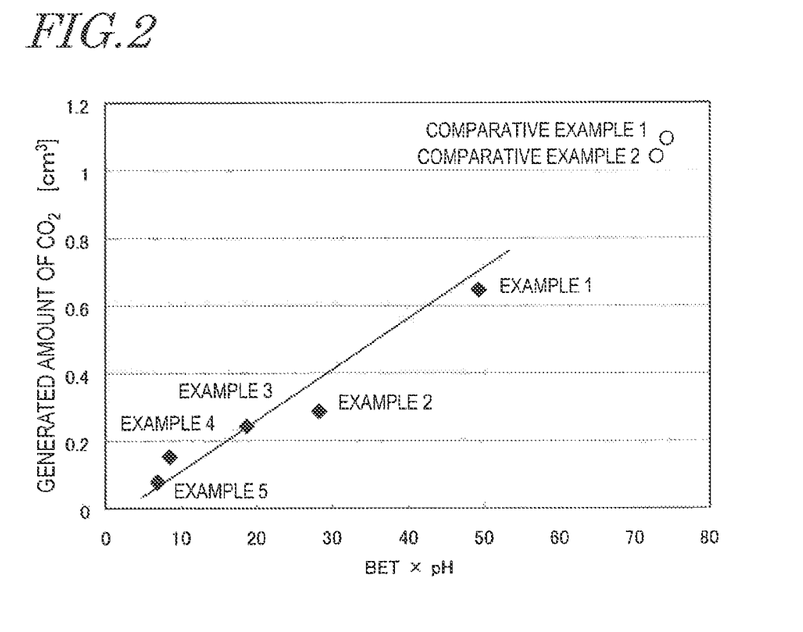
FIG. 2 A graph showing a relationship between a physical index B×P and the amount of generated $CO_2$.

Next, the evaluation sample was placed in a thermostat vessel, and retained at 60° C., for one week. Thereafter, this was taken out of the thermostat vessel, and a quantitative analysis of the generated $CO_2$ was made by gas chromatography (MicroGC CP4900 manufactured by Varian). Amounts of generated $CO_2$ as calculated from these results are shown in Table 1. Also, FIG. 2 shows the relationship between the B×P value as defined by eq. (1) and the $CO_2$ generation, shown in Table 1, for Examples 1 to 5 and Comparative Examples 1 and 2.

TABLE 1

| negative-electrode active material | B (specific surface) [$m^2/g$] | P (pH) | B × P value | $CO_2$ amount [$cm^3$] |
|---|---|---|---|---|
| Example 1 | 4.6 | 10.7 | 49.2 | 0.65 |
| Example 2 | 2.7 | 10.4 | 28.1 | 0.29 |
| Example 3 | 1.8 | 10.3 | 18.5 | 0.24 |
| Example 4 | 0.8 | 10.4 | 8.3 | 0.15 |
| Example 5 | 0.7 | 9.7 | 6.8 | 0.09 |
| Comparative Example 1 | 6.4 | 11.6 | 74.2 | 1.09 |
| Comparative Example 2 | 6.7 | 10.9 | 73.0 | 1.04 |

From Table 1 and FIG. 2, it is considered that the amount of generated $CO_2$ is in proportion to the B×P value. Moreover, a comparison between the results of Examples 1 to 3 and a comparison between the results of Examples 4 and 5 indicate that it is not the pH value alone, or the specific surface alone, that affects the amount of generated $CO_2$.

Patent Document 2 describes that, by ensuring that the pH value of the negative-electrode active material as defined in the present application is smaller than 11.2, it is possible to maintain battery capacity and suppress side reactions. However, the result of Comparative Example 2 indicates that, even if the conditions of Patent Document 2 are satisfied, $CO_2$ generation may still not be sufficiently suppressed. This is presumably because the B×P value is greater than 50.

On the other hand, FIG. 2 indicates that the amount of generated $CO_2$ is sufficiently reduced in Examples 1 to 5 because the B×P value is smaller than 50. In particular, it can be seen that the amount of generated $CO_2$ is suppressed when the B value and the P value are, not less than 0.7 $m^2/g$ and not more than 4.7 $m^2/g$, and not less than 9.7 and not more than 10.7, respectively. It can also be seen that, when the B×P value is smaller than 30, the amount of generated $CO_2$ can be made 0.4 $cm^3$ or less under the above conditions.

Thus, the B×P value may be smaller than 30.

5. Evaluation of Discharge Output Characteristics

In the manner described in the second embodiment, lithium-ion secondary batteries in which the negative-electrode active materials of Examples 1 to 5 and Comparative Examples 1 and 2 was used were produced. The results of evaluating the discharge output characteristics thereof will be described.

<Production of the Positive Electrode>

As the positive-electrode active material, $LiNi_{0.80}Co_{0.15}Al_{0.05}O_2$ (average particle size: 10.8 μm; specific surface according to BET technique: 0.48 $m^2/g$) was prepared. To 100 parts by weight of the active material, 3 parts by weight of acetylene black as an electrically-conductive substance and 4 parts by weight of polyvinylidene fluoride as a binder agent, and an appropriate amount of N-methyl-2-pyrrolidone were added, and through agitation and mixing a slurry of positive electrode mixture was obtained. Note that the polyvinylidene fluoride had been dissolved in N-methyl-2-pyrrolidone prior to use.

Next, as shown in FIG. 1(*c*), the slurry of positive electrode mixture (positive-electrode active material layers 1*b*) was applied on both faces of a positive-electrode current collector 1*a* made of an aluminum foil with a thickness of 20 μm, and the coating was dried and rolled out with rollers.

The method of preparing $LiNi_{0.80}Co_{0.15}Al_{0.05}O_2$, used as the positive-electrode active material, was as follows. In an aqueous solution of nickel sulfate at a concentration of 1 mol/l, cobalt sulfate was added to a predetermined ratio, thus preparing an aqueous metal-salt solution. While agitating at low speed this aqueous metal-salt solution being maintained at 50° C., an alkaline solution containing 30 weight % of sodium hydroxide was added dropwise to a pH of 12, thus obtaining a hydroxide precipitate. This precipitate was filtrated and washed with water, and thereafter dried by being heated to 80° C. in the air.

The resultant hydroxide was agitated within water in a reaction vessel at 30° C., and a predetermined amount of $NaAlO_2$ was added to the reaction vessel. After sufficient agitation, it was neutralized with sulfuric acid until the pH within the reaction vessel reached 9. As a result, aluminum hydroxide, which is an Al-containing compound, was homogeneously deposited on the surface of the hydroxide. Thereafter, moisture was removed, and 10 hours of baking was performed at 700° C. in an air ambient, whereby a ternary oxide $[Ni_{0.80}Co_{0.15}Al_{0.05}]O$ was obtained. Through powder X-ray diffraction, it was confirmed that the resultant oxide had a single phase.

In the resultant oxide, lithium hydroxide monohydrate powder was further mixed so that the combined mole numbers of Ni, Co and Al and the mole number of Li constituted a ratio of 1:1, and this was warmed to 750° C. over 10 hours in an oxygen ambient, and subjected to 36 hours of heat treatment at 750° C., thereby obtaining the $LiNi_{0.80}Co_{0.15}Al_{0.05}O_2$ of interest. Through powder X-ray diffraction (manufactured by Rigaku Corporation), it was confirmed that the resultant $LiNi_{0.80}Co_{0.15}Al_{0.05}O_2$ had a single phase of hexagonal layer structure. After pulverization and size classification processes, it was confirmed through an observation under a scanning electron microscope (manufactured by Hitachi High-Technologies Co., Ltd.) that a large number of primary particles on the order of 0.2 μm to 1.0 μm had aggregated form substantially spherical or ellipsoidal secondary particles. Note that the average particle size was determined by using a scatter-type grain size distribution measurement apparatus (manufactured by HORIBA).

Figure 3:
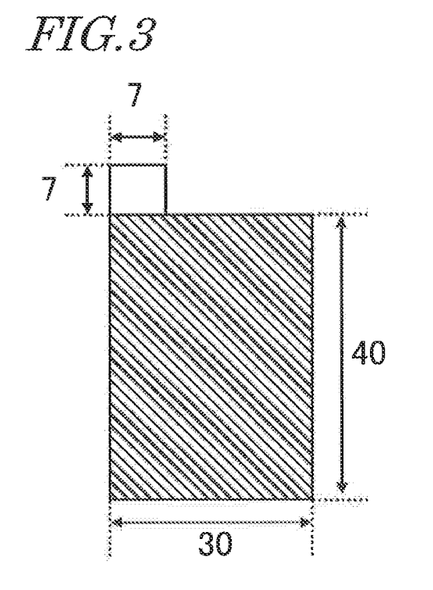
FIG. 3 A diagram showing the electrode dimensions of a positive electrode which was used in a battery for discharge output characteristics evaluation.

The resultant electrode plate was punched out in dimensions shown in FIG. 3, and the positive electrode mixture (positive-electrode active material layers 1*b*) at a tab portion where a lead was to be attached was delaminated, thus obtaining the positive electrode 1. The positive-electrode current collector 1*a* having the positive electrode mixture (positive-electrode active material layers 1*b*) applied thereon has a rectangular shape of 30 mm×40 mm.

<Production of the Negative Electrodes>

As the negative-electrode active material, lithium titanate of Example 1 was used. To 100 parts by weight of the active material, 4 parts by weight of acetylene black as an electrically-conductive substance, 5 parts by weight of polyvinylidene fluoride as a binder agent, and an appropriate amount of N-methyl-2-pyrrolidone were added, and through agitation and mixing a slurry of negative electrode mixture was obtained. Note that the polyvinylidene fluoride had been dissolved in N-methyl-2-pyrrolidone prior to use.

Next, as shown in FIG. 1(*c*), the slurry of negative electrode mixture (negative-electrode active material layer 2*b*) was applied on one face of a negative-electrode current collector 2*a* made of an aluminum foil with a thickness of 20 μm, and the coating was dried and rolled out with rollers.

Figure 4:
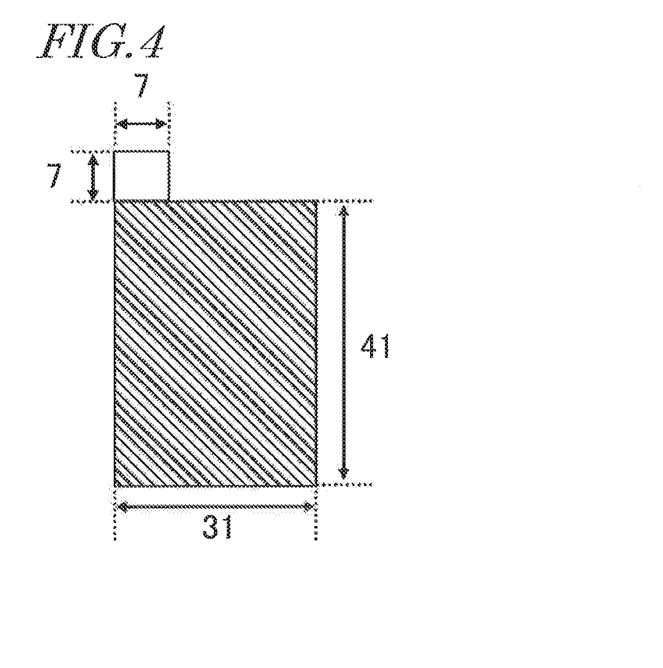
FIG. 4 A diagram showing the electrode dimensions of a negative electrode which was used in a battery for discharge output characteristics evaluation.

The resultant electrode plate was punched out in dimensions shown in FIG. 4, and the negative electrode mixture (negative-electrode active material layer 2*b*) at a tab portion where a lead was to be attached was delaminated, thus obtaining the negative electrodes 2. The negative-electrode current collector 2*a* having the negative electrode mixture (negative-electrode active material layer 2*b*) applied thereon has a rectangular shape of 31 mm×41 mm. The active material weight per unit area of each negative electrode was adjusted to be 1.25 times the active material weight per unit area of the opposing positive electrode one face.

<Assembly>

The resultant positive electrode 1 and negative electrodes 2 were stacked via separators 3, thus producing an electrode group 13 as shown in FIG. 1(*c*). As the separator, a microporous film of polyethylene with a thickness of 20 μm was used.

Next, as shown in FIG. 1(*a*), a positive electrode lead 11 of aluminum was welded to the positive electrode 1, and a negative electrode lead 12 of aluminum was welded to the negative electrodes 2, of the electrode group 13. Thereafter, the electrode group 13 was accommodated in the interior of a battery case 14 which was made of an aluminum laminate film with a thickness of 0.12 mm and opened in three directions, and attached on the inner surface of the battery case 14 with a polypropylene tape. The openings were thermally welded, including the openings through which the positive electrode lead 11 and the negative electrode lead 12 projected but excluding one opening which was not thermally welded, so that the battery case 14 was in a form of bag. An electrolyte solution 15 was injected through the opening which had not been thermally welded, and then placed under reduced pressure and degassed. Thereafter, this opening was thermally welded under reduced pressure, thus sealing the battery interior. The electrolyte solution 15 used was obtained by dissolving $LiPF_6$ (commercial battery grade) as a supporting electrolyte salt at a concentration of 1 mol/l in a nonaqueous solvent in which ethylene carbonate (EC)(commercial battery grade) and ethyl methyl carbonate (EMC)(commercial battery grade) were mixed at a ratio of 1:3. The produced battery was sized so as to have a thickness of 0.5 mm, a width of 50 mm, and a height of 100 mm. The design capacity when charging this battery at 2.7 V was 50 mAh. The battery thus produced is designated battery A.

Batteries which were produced in a similar manner, except for using the lithium titanates of Examples 2 to 5 and Comparative Examples 1 and 2 as the negative-electrode active material, are designated batteries B to G.

<Finish Charge-Discharge>

In an environment under room temperature, the produced batteries A to G were subjected to a constant-current charging up to 2.7 V with a current value of 2.5 mA, and thereafter a constant-current discharging down to 1.5 V with a current value of 2.5 mA. This charge-discharge was again performed to obtain a complete battery. The discharge capacity in the second instance was defined as the initial discharge capacity.

<Output Characteristics Evaluation>

In an environment under room temperature, batteries A to G having gone through the finish charge-discharge was subjected to a constant-current charging up to 2.7 V with a current value of 2.5 mA, and then a constant-current discharging down to 1.5 V with a current value of 100 mA. The discharge capacity which was known from this was defined as the high-rate discharge capacity.

The indices of output characteristics of the battery are defined below.

output characteristics (%)=high-rate discharge capacity (mAh)/initial discharge capacity (mAh)×100

The output characteristics of the resultant batteries A to G are shown in Table 2.

TABLE 2

| negative-electrode active material | battery | initial discharge capacity [mAh] | high-rate discharge capacity [mAh] | output characteristics [%] |
|---|---|---|---|---|
| Example 1 | battery A | 51.4 | 43.7 | 85.0 |
| Example 2 | battery B | 51.6 | 43.4 | 84.2 |
| Example 3 | battery C | 50.8 | 42.4 | 83.5 |
| Example 4 | battery D | 50.1 | 41.3 | 82.4 |
| Example 5 | battery E | 49.2 | 40.3 | 81.9 |
| Comparative Example 1 | battery F | 50.7 | 43.2 | 85.3 |
| Comparative Example 2 | battery G | 51.3 | 43.7 | 85.2 |

As shown in Table 2, it can be seen that the output characteristics of the negative-electrode active materials of Examples all exhibit values as high as 80% or more. The current value 100 mA used in the high-rate discharge is a current value that would discharge each produced battery in 30 minutes; thus, the ability to discharge 80% or more of the total capacity of the battery at such a high current value indicates a sufficient output performance in practice.

Figure 5:
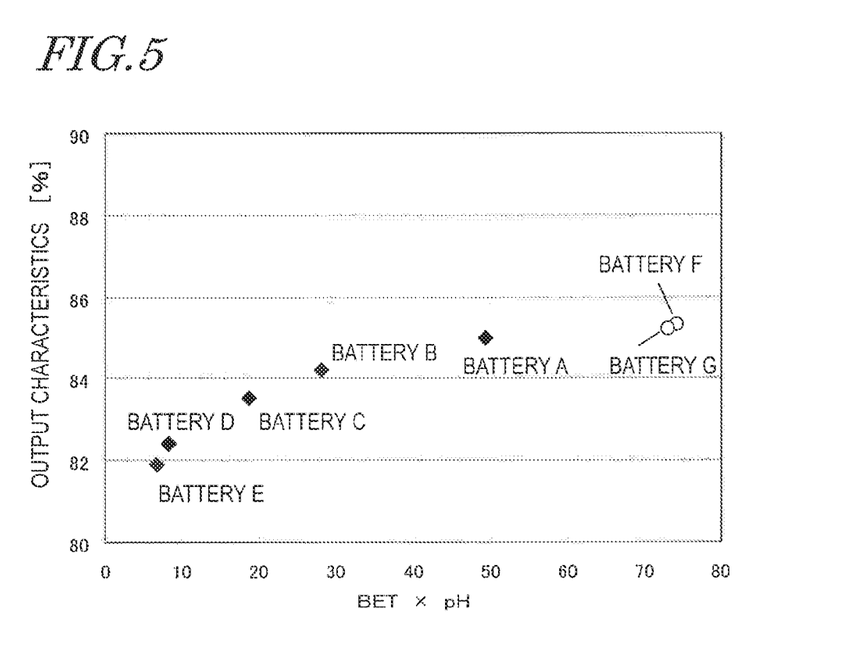
FIG. 5 A graph showing a relationship between a physical index B×P and the output characteristics.

FIG. 5 shows a relationship between the B×P value as defined by eq. (1) above, which is a physical index of the negative-electrode active material of the present embodiment, and the output characteristics. The output characteristics are somewhat affected by the specific surface of the active material; therefore, the output characteristics are somewhat improved as the B×P value defined by eq. (1) above increases. However, the improvement in output performance due to the increased B×P value tends to saturate, and no significant differences in output characteristics are observed between battery A, in which the active material of Example 1 was used, and batteries F and G, in which the active materials of Comparative Examples 1 and 2 were used. Therefore, by ensuring that the B×P value is smaller than 50, it becomes possible to provide a lithium-ion secondary battery with an excellent reliability, having excellent output characteristics and not generating much gas during storage at high temperatures.

INDUSTRIAL APPLICABILITY

According to an aspect of the present invention, a lithium-ion secondary battery having an excellent reliability and not generating much gas during storage at high temperatures is provided. In particular, the present invention is suitably used for lithium-ion secondary batteries in which lithium titanate is used as the negative electrode material.

REFERENCE SIGNS LIST 1 positive electrode
1a positive-electrode current collector
1b positive-electrode active material layer
2 negative electrode
2a negative-electrode current collector
2b negative-electrode active material layer
3 separator
11 positive electrode lead
12 negative electrode lead
13 electrode group
14 battery case
15 electrolyte solution

The invention claimed is:

1. A negative-electrode active material comprising a lithium titanate having a spinel structure, wherein
the relationship B×P<18.5 is satisfied,
where B is a specific surface (unit: m²/g) of the lithium titanate as measured by a BET technique; and P is obtained by immersing 1 g of the lithium titanate in 50 cm³ of redistilled water and determining a pH of the redistilled water after 30 minutes of agitation.

2. The negative-electrode active material of claim 1, wherein B is not less than 0.7 m²/g and not more than 1.8 m²/g, and P is not less than 9.7 and not more than 10.3.

3. The negative-electrode active material of claim 1, wherein the lithium titanate has a composition expressed as $Li_4Ti_5O_{12}$.

4. The negative-electrode active material of claim 1, wherein the lithium titanate has been washed with water.

5. The negative-electrode active material of claim 1, wherein the lithium titanate has been washed with hot water.

6. An electricity storage device comprising a negative electrode containing the negative-electrode active material of claim 1.

7. A method of producing the negative-electrode active material of claim 1, comprising:
a step of, after synthesizing the lithium titanate, washing the lithium titanate with a liquid.

8. The method of producing the negative-electrode active material of claim 7, wherein a main component of the liquid is water, and the water has a temperature of not less than 40° C. and not more than 80° C.

9. A method of producing a negative-electrode active material of claim 1, comprising a step of baking titanium oxide and at least one of lithium hydroxide and lithium carbonate in a molten salt to synthesize a titanium oxide having a spinel structure.

10. The method of producing a negative-electrode active material of claim 9, wherein the molten salt is obtained by mixing and melting lithium chloride and potassium chloride.

* * * * *